Oct. 6, 1964 L. TROY 3,151,710
THERMALLY COMPENSATING BRAKE DRUM
Filed Aug. 30, 1962 2 Sheets-Sheet 1

INVENTOR
LEONARD TROY

BY
ATTORNEY

Oct. 6, 1964   L. TROY   3,151,710
THERMALLY COMPENSATING BRAKE DRUM
Filed Aug. 30, 1962   2 Sheets-Sheet 2

INVENTOR
LEONARD TROY

BY
ATTORNEY

United States Patent Office 3,151,710
Patented Oct. 6, 1964

3,151,710
THERMALLY COMPENSATING BRAKE DRUM
Leonard Troy, 5 Pen-Y-Bryn Drive, Scranton, Pa.
Filed Aug. 30, 1962, Ser. No. 233,993
3 Claims. (Cl. 188—218)

This invention relates generally to vehicle brakes and is particularly concerned with an improved brake drum compensating for thermal expansion due to a brake application.

Brake drums incorporating radial cooling fins are known in the prior art. However, most brake drums of the "rotor-stator" type are of a considerable mass and the tremendous amount of heat generated during normal and "panic" stops, for example, subjects the drums to internal stresses and tremendous pressures which have resulted in drum warpage, as well as "heat checking" on the inner surface.

Brake drums of the "rotor-stator" type are of a considerable mass and the tremendous amount of heat and internal stresses and pressures often cause warpage, "heat checking" and there has been a constant search in the art to attain a "cool running" drum which maintains expansion with permissive limits to obviate brake "fade" and excessive distortion.

Various means have been proposed for the purpose of obtaining a "cool running" drum; for example, radial fins, apertures in the drum, etc.

The extreme heat generation in prior art brake drums tends to cause what is defined in the art as brake "fade," whereby, especially during "panic" stops, the drum expands to such a degree that after a predetermined interval of maximum brake application, the brakes are no longer effective, primarily due to excessive thermal expansion of the drum. Excessively massive brake drums have not been found to be satisfactory or afford the solution to the problem of efficient braking, and there is a constant endeavor to reduce the vehicle mass in order to increase its "payload," reduce fuel consumption, etc.

A primary object of the present invention is to provide a novel brake drum substantially overcoming the failings of the prior art, and which is readily manufactured, light in weight and highly practical and satisfactory.

A further object of the present invention is to provide a novel brake drum including novel thermal expansion compensating structure of a simple and effective character.

Another more particular object of the present invention is to provide a novel brake collar exteriorally engaged by spring means in engagement with a relatively rigid ring member against which the spring means react whereby relative expansion and contraction between the collar and the ring member is permitted to compensate for expansion and internal structural stresses during heat generation in the drum.

A still further object of the present invention is to provide novel inner peripheral expansion compensating means on the inner surface of a brake drum reducing "heat check" and warping, and cooler operating brake shoes to accordingly reduce the wear thereon.

With the above and other objects in view that will hereinafter become apparent, the nature of the invention will be more clearly understood by reference to the following description taken in conjunction with the appended drawings illustrating, by way of example only, exemplary embodiments of the invention, in which:

Figure 1:
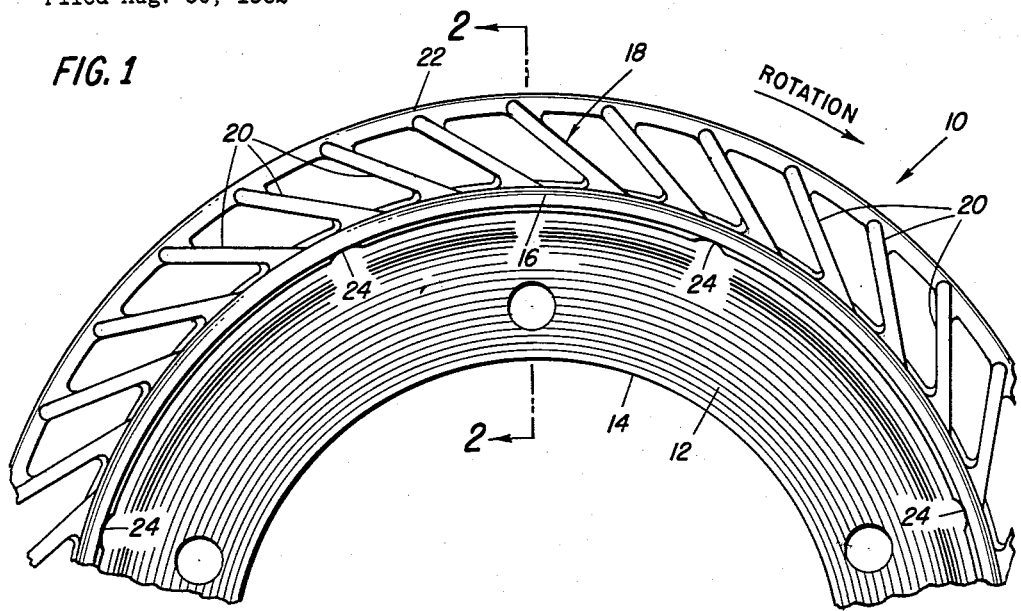
FIGURE 1 is a fragmentary side elevation of a brake drum incorporating the features of the invention, looking into the drum.

Referring to the drawings in detail, a fragmentary portion of a brake drum is indicated generally at 10. The drum 10 includes a suitable mounting plate 12 centrally apertured at 14 for receiving a wheel axle (not shown) therethrough.

Figure 2:
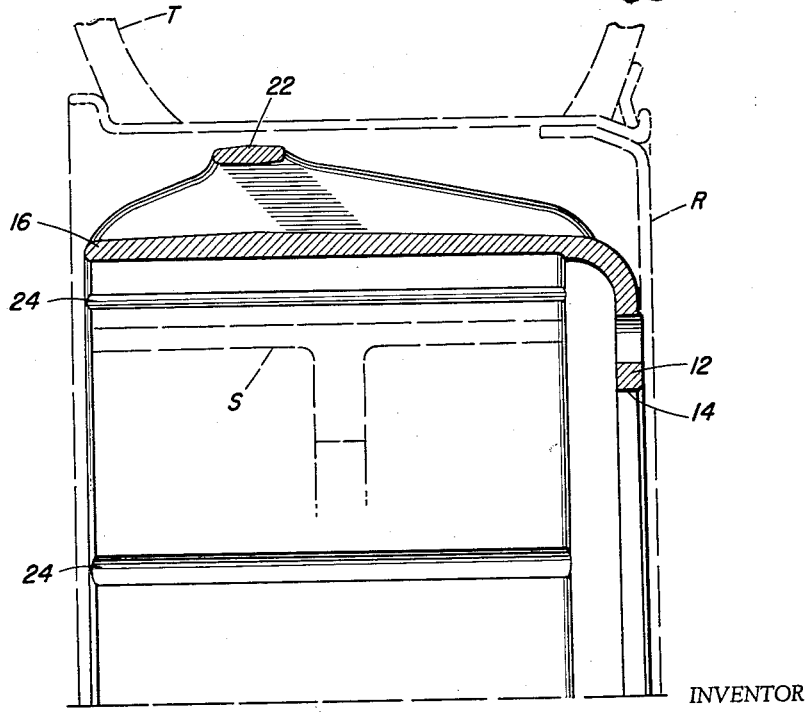
FIGURE 2 is a vertical section taken substantially on the plane of line 2—2 of FIGURE 1, showing by phantom lines a fragmentary portion of a brake shoe and wheel rim.

The mounting plate 12 is generally cast integral with an annular, peripheral collar 16. Disposed within the collar are suitable brake shoes, one of which being shown diagrammatically at S by phantom lines in FIGURE 2. The drum 10 will be mounted by means of the plate 12 within a wheel rim R which accommodates thereon a tire T.

Formed integrally on the outer surface of the collar 16 is spring means indicated generally at 18 and comprising a plurality of angularly disposed spring elements 20 which diverge from the preferred direction of rotation of the brake drum, as shown in FIGURE 1. The terminal ends of the spring elements 20 are formed integral with an annular, relatively rigid ring member 22 which provides a base against which the spring elements 20 react due to the different thermal expansion characteristics of the collar 16 as compared with the ring member 22.

Figure 5:
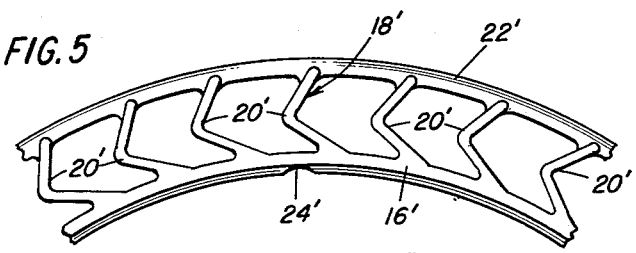
FIGURE 5 is a fragmentary view similar to a portion of FIGURE 1, showing another embodiment of the invention.

The spring fins 20 are inclined at a predetermined angle, and may assume various shapes. In FIGURE 5, the collar 16' has projecting from the outer surface thereof transverse, chevron or V-shaped spring fins 20' which are integral with a rigid ring member 22'.

Figure 6:
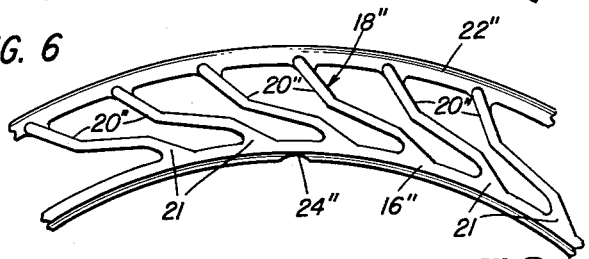
FIGURE 6 is a fragmentary view similar to FIGURE 4, showing still another embodiment of the invention.

In FIGURE 6, another embodiment of spring fin 20" is shown, it being noted that these spring fins have an enlarged base portion 21 integral with the outer surface of an annular collar 16", the terminal ends of the spring fins 20" being secured to the inner periphery of a ring or reaction member 22".

Although the spring fins 20, 20' and 20" are essentially leaf springs, these spring means may comprise any suitable form, for example, coil springs (not shown), and although actual tests have been conducted by using leaf springs integral with the ring member, the invention encompasses the expedient of separable springs, coil or leaf, etc., and the ring or reaction members 22, 22' and 22" may be a separate element and not fixedly secured to the spring elements.

The annular collars 16, 16' or 16" engaged by the brake shoe optionally include on the inner surface a plurality of circumferentially spaced, transverse grooves 24, 24' and 24", respectively, which are engaged by the brake lining. These grooves prevent "heat check" and tend to maintain the brake linings cooler than conventional brake drums. The fact that grooves on the inner surface of the drums might lead one to conclude that excessive wear would occur on the brake lining, the contrary has proved evident.

The grooves 24, 24' and 24" may be formed by machining or cast in the drums. When the brakes are applied, especially during a "panic" stop, the inner surface of the collars 16, 16' and 16" will be heated much quicker than the outer surface, resulting in the inner surface expanding more rapidly than the outer surface. In effect, the cooler outer surface of the collars tend to restrain expansion of the collar. This function or phenomenon often causes the hotter inner collar surface to yield in compression, i.e., become warped or become distorted. Cooling of the collar, when the brake application ceases, during contraction tends to form cracks on the inner surface commonly described as "heat check." The grooves 24, 24' and 24" obviate heat check by allowing for immediate expansion and contraction of the inner, hot surface of the drum, relieve internal stresses and additionally provide a cooler running brake lining than was heretofore possible.

Referring to the spring means 18, or 18' and 18" of FIGURES 5 and 6, respectively, the previously mentioned heat generated at the collar during "panic" stops and otherwise, causes internal compression on the collar material and the spring members 22, 22' and 22" are subject to bending.

Figure 3:
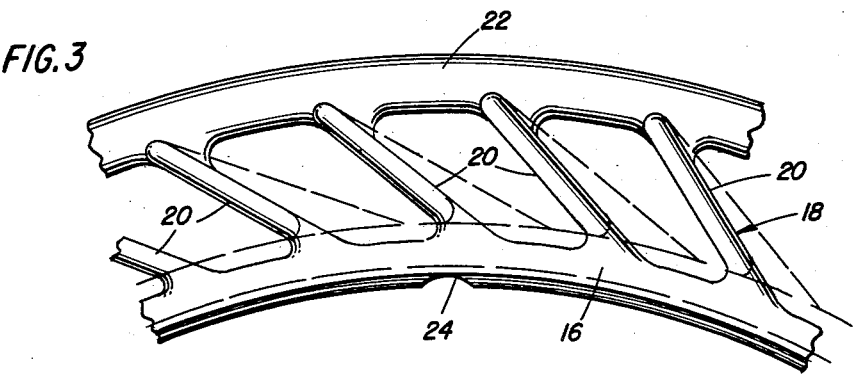
FIGURE 3 is an enlarged fragmentary elevational view of a portion of FIGURE 1, showing by phantom lines the theoretical position assumed by the spring elements during expansion of a brake collar.
Figure 4:
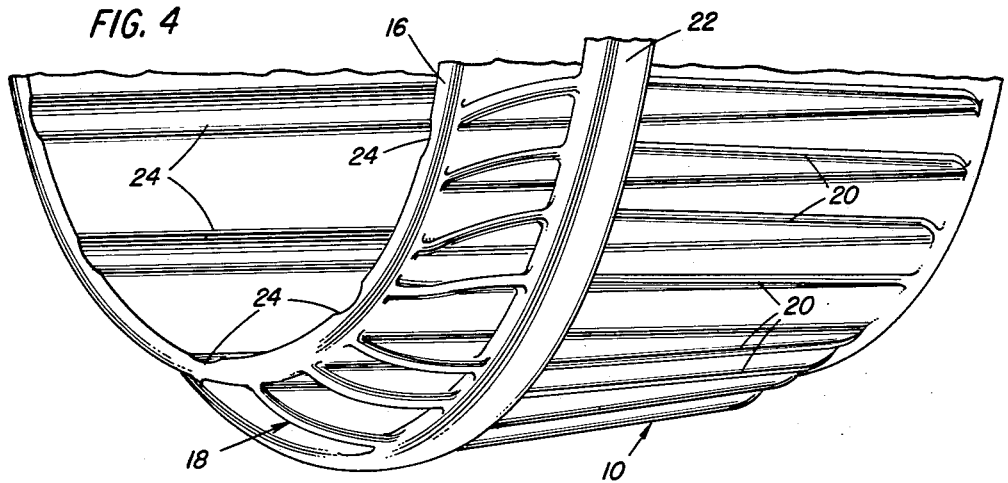
FIGURE 4 is a fragmentary perspective view of the brake drum of FIGURES 1–3.

The spring means are not for the express purpose of conducting heat from the collars, although this function does occur. The collar which expands much more readily and faster than the ring members is permitted to have some relative outward radial movement, as illustrated in the exaggerated showing in FIGURE 3. The ring members which expand a lesser amount because they are relatively cooler than the collars provide a reaction member for the spring means. Thus, the spring means permit thermal expansion of the collars, within permissive limits, yet maintain a reaction surface against which the brake shoes will react.

The fins additionally permit thinner collar walls to be utilized since the spring means provides a mechanical restraining force utilizing the energy generated due to the heat in the collar to actually restrain the collar from excessive distortion and expansion.

The spaces between the fins incidentally afford a lightening of the drums as well as convection means for dissipating heat. The angled relationship of the spring fins also serves as fans to cause air movement adjacent the outer surface of the collars.

The ring members may be located at different positions depending upon the type of tire rims with which the drums are used or other considerations of design, for example.

The foregoing is to be considered as illustrative only of the principles of the invention. Further, since numerous modifications and changes will occur to those skilled in the art, the invention is not to be considered to be limited to what has been shown and described, and all modifications and equivalents may be resorted to as fall within the scope of the appended claims.

What is claimed as new is:

1. A one-piece, integrally cast brake drum comprising a body member including a mounting plate and a laterally projecting annular collar, said collar including a plurality of independent external, relatively flexible spring fin elements each extending angularly and outwardly in a common direction from the outer surface of said collar and substantially transversely across the entire width of said collar, and an annular narrow reinforcing ring element having an amount of thermal expansion less than that of said collar and integral with only an intermediate edge portion of said fin elements and concentric to the outer surface of said collar, said fin elements having free exposed outer edges extending from opposite sides of said reinforcing ring whereby said annular collar may expand more rapidly than said reinforcing ring and the relatively flexible, independent spring fin elements will react against said reinforcing ring to restrain such expansion while functioning as free fan blades to move air surrounding said drum while dissipating heat due to convection at the exposed portions of said fin elements.

2. The structure of claim 1 in which said spring fin elements taper at opposite ends toward the outer surface and outer peripheral edges of said collar for reducing the weight of said brake drum.

3. The structure of claim 2 in which said annular collar includes a plurality of grooves on the inner surface thereof and extending the entire width and at right angles to the peripheral edge thereof for permitting the inner surface material of said collar to expand without causing relative forces to be imposed on said spring fin elements.

References Cited in the file of this patent

UNITED STATES PATENTS

| | | |
|---|---|---|
| 1,928,079 | Taylor | Sept. 26, 1933 |
| 2,702,613 | Walther | Feb. 22, 1955 |

FOREIGN PATENTS

| | | |
|---|---|---|
| 203,755 | Switzerland | Aug. 1, 1939 |